(12) United States Patent
Dreyer et al.

(10) Patent No.: US 11,678,610 B2
(45) Date of Patent: Jun. 20, 2023

(54) TINE PADDLE FOR REEL OF A CROP HARVESTING HEADER

(71) Applicant: AGCO Corporation, Duluth, GA (US)

(72) Inventors: Daniel Dreyer, Hesston, KS (US);
Shane A. Bollinger, Hesston, KS (US);
Dane Austin Mosel, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 492 days.

(21) Appl. No.: 16/986,054

(22) Filed: Aug. 5, 2020

(65) Prior Publication Data

US 2021/0037711 A1 Feb. 11, 2021

Related U.S. Application Data

(60) Provisional application No. 62/882,874, filed on Aug. 5, 2019.

(51) Int. Cl.
| | | |
|---|---|---|
| *A01D 57/02* | (2006.01) | |
| *A01D 80/02* | (2006.01) | |
| A01D 78/14 | (2006.01) | |

(52) U.S. Cl.
CPC .............. *A01D 57/02* (2013.01); *A01D 80/02* (2013.01); *A01D 78/14* (2013.01)

(58) Field of Classification Search
CPC ........ A01D 57/02; A01D 80/02; A01D 78/14; A01D 57/03; A01D 57/023; A01D 57/01; A01D 57/00
See application file for complete search history.

(56) References Cited

U.S. PATENT DOCUMENTS

| | | | |
|---|---|---|---|
| 4,882,899 A | 11/1989 | Jasper et al. | |
| 6,199,357 B1 * | 3/2001 | Bloom | ................. A01D 57/02 56/220 |
| 7,650,737 B1 * | 1/2010 | Lovett | ................... A01D 57/02 56/220 |
| 9,226,447 B2 | 1/2016 | Noll et al. | |
| 10,440,890 B1 * | 10/2019 | Kastning | ............... A01D 89/006 |
| 10,674,668 B2 * | 6/2020 | Schroeder | ............. A01D 80/02 |
| 2005/0091955 A1 * | 5/2005 | Glazik | ................... A01D 57/02 56/220 |
| 2007/0266692 A1 * | 11/2007 | Lolley | ................. A01D 89/002 56/364 |

(Continued)

FOREIGN PATENT DOCUMENTS

JP 2005211010 A 8/2005

OTHER PUBLICATIONS

UK Intellectual Property Office, Search Report for Related UK Application No. GB1911588.0, dated Feb. 10, 2020.

*Primary Examiner* — Adam J Behrens
*Assistant Examiner* — Julia I Bartlett-Sloan

(57) ABSTRACT

A reel for a harvesting header has a tine paddle mounted to a tine so as to engage the crop materials as the tine rakes through the crop materials. The tine paddle has a collar portion for at least partially wrapping around a tine tube to which the tine is mounted and an elongate plate member with a distal end spaced inwardly from the outer finger tip of the tine to which the at least one paddle is mounted. One side of the plate member has first and second detents arranged to partially wrap around and engage the finger to hold the tine paddle on the tine. Each detent has an inwardly extending catch that is received in a notch in a side portion of the finger.

5 Claims, 5 Drawing Sheets

(56) References Cited

U.S. PATENT DOCUMENTS

| | | | |
|---|---|---|---|
| 2007/0289280 A1* | 12/2007 | Marquardt | A01D 57/02 56/16.1 |
| 2010/0281840 A1* | 11/2010 | Remillard | A01D 57/02 56/220 |
| 2013/0263566 A1 | 10/2013 | Lovett et al. | |
| 2015/0089916 A1 | 4/2015 | Schroeder et al. | |
| 2016/0316629 A1 | 11/2016 | Wenger | |
| 2022/0000030 A1* | 1/2022 | Mossman | A01D 57/02 |

* cited by examiner

TINE PADDLE FOR REEL OF A CROP HARVESTING HEADER

BACKGROUND OF THE INVENTION

Field of Invention

This invention relates generally to agricultural crop harvesting header having a pickup reel, and particularly to a tine paddle mounted onto a tine on the tine support tube of the reel.

Description of Related Art

Crop harvesting headers include a cutter bar and a reel utilizing a plurality of tines or fingers for controlling movement of the crop in the area over the cutter bar. A crop harvesting header can be used in a variety of different crops with varying conditions such as green, tough, lying down, wet, or tangled. Desirably, the reel needs to be able to function in all these crop situations to feed the crop uniformly into the harvester.

Typically, the reel is rotatable about an axis generally parallel to the cutter bar and has a plurality of reel tubes spaced around the axis of a center tube. Each reel tube has several tines projecting generally radially outward from the reel axis that interact with the crop through different zones around the reel. The tines first need to pick up any crop that is laying down and push any crop that is standing across the cutter bar and carrying the crop over the cutter bar to the table or draper. A reel of this type is shown in commonly assigned U.S. Pat. No. 9,820,440 issued to Jost et al.

While the fingers are generally acceptable for picking up and moving crop during normal condition, in some conditions with short or light crop, the fingers can pass between the stems of the light crop and thus miss engaging the stems such that the pickup reel struggles to move the crop away from the cutter bar. This causes the cutter bar to fill with crop and can lead to restrictions in cutting or even plugging resulting in an unacceptable high percentage of crop loss, thus exacerbating the already low crop production in the light crop conditions.

Therefore, a need exists in the art for an improved attachment to better engage the crop in light crop conditions.

OVERVIEW OF THE INVENTION

In one aspect, the invention is directed to a reel of a harvesting header for harvesting crop materials. The reel has a plurality of tine tubes at spaced positions around a rotational axis of the reel and a plurality of longitudinally-spaced tines mounted on each of the plurality of tine tubes configured to project outwardly from the tine tubes for engaging the crop materials. Each tine tube pivots about its own individual axis so as to change the angular orientation of the tines mounted thereon as the tine tubes rotate through different zones around the reel as the reel rotates about the rotational axis of the reel. Each tine includes a mounting base configured to receive the tine tube on which the tine is mounted and an elongated finger projecting outwardly from the mounting base to an outer finger tip. The reel also includes a tine paddle mounted to one of the plurality of tines so as to engage the crop materials as the tine rakes through the crop materials. The tine paddle has a collar portion for at least partially wrapping around the tine tube to which the tine is mounted and an elongate plate member with a distal end spaced inwardly from the outer finger tip of the tine to which the at least one paddle is mounted. One side of the plate member has first and second detents arranged to partially wrap around and engage the finger to hold the tine paddle on the tine. Each detent has an inwardly extending catch that is received in a notch in a side portion of the finger.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications, configurations and equivalents as will become apparent from consideration of the following detailed description.

Figure 1:
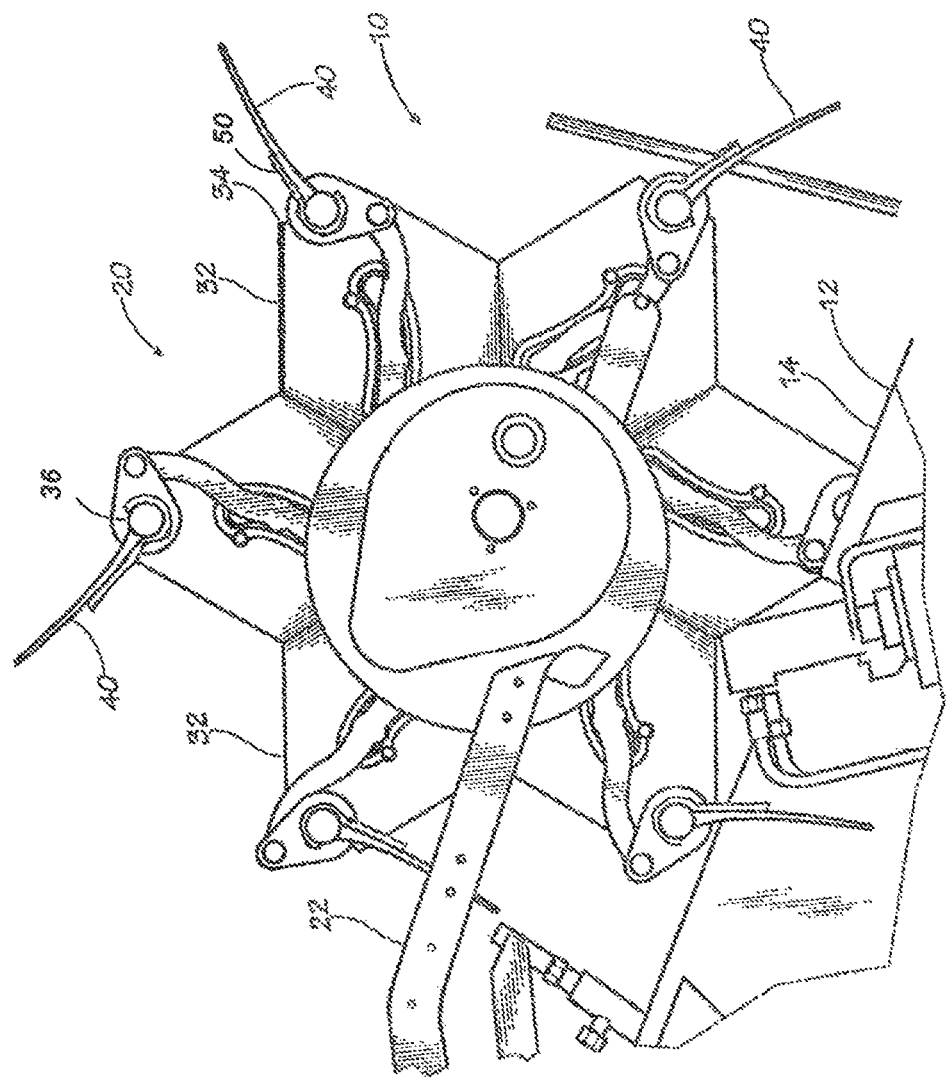
FIG. 1 is a side view showing in general a reel of the type with which the present invention is concerned.

An embodiment of a harvesting header is shown in FIG. 1. The header 10 includes a header frame 12 extending between two end frames, one of which is shown at 14, and the other of which at the other end of the header 10 and therefore not visible in the elevation of FIG. 1. The header frame 12 is suitably supported and attached on a propulsion vehicle in a manner so that the header 10 can be moved forwardly across the ground in cutting a standing crop. The header 10 carries a plurality of structural elements such as for a draper or auger conveyor arranged to transport the crop after cutting to a discharge location in the center of the header 10 that are not shown for convenience of illustration as they are well known to one skilled in the art and can vary in accordance with engineering considerations. Additionally, as is well known in the art, a cutter bar provides a cutting action on the standing crop so that the crop is deposited on the conveyor for transportation to the discharge location. When used on a combine harvester, the discharge location of the header 10 is associated with a crop transfer system which transfers the crop rearwardly into a feeder house of the combine. Headers 10 of this type can of course also be used as a swather where the discharge location simply discharges the crop onto the ground in a swath or through a crop conditioner onto the ground.

The header 10 further includes a reel generally indicated at 20. The reel 20 includes pivotable mounting arms 22 that project forwardly from the frame 12 to a position over the end frame elements 14 so as to provide support for the reel 20. As is known in the art, each arm 22 is movable in its pivotal action by a suitable drive actuator. The number of arms 22 can vary in accordance with engineering requirements depending upon the width of the header 20. Some headers 20 have only arms 22 at the ends and some have additional arms intermediate the ends to provide the necessary support. The reel 20 is rotatably mounted on the arms 22 as known in the art. The reel 20 carries a plurality of support plates 32 at spaced positions around the rotation axis of the reel 20. Each support plate 32 extends generally outwardly to a distal end 34 where the plates 32 support a plurality of tine tubes 36, broadly tine-supporting members, at angularly spaced positions around the axis of the reel 20. While the illustrated embodiment has a plurality of plates 32 positioned around the reel 20, one skilled in the art will understand that the plate 32 may be configured to support more than one or even all of the tine tubes 36.

In the embodiment shown, the tine tubes 36 are cylindrical tubes on which is attached a plurality of longitudinally spaced tines 40 which project outwardly from the tube 36 for engaging the crop. Tines 40 may be of conventional design and may be attached to the tine tubes 36 using any means known in the art so further discussion of the tines 40 need not be contained herein. Each tine tube 36 pivots about its own individual axis so as to change the angular orientation or position of the tines 40 as the tine tubes 36 rotate through different zones around the reel 20 as best seen in FIG. 1. One exemplary header 10 is shown in commonly assigned U.S. Pat. No. 9,820,440 to Jost et al. Since the general construction of such headers is well known to one skilled in the art, further detail need not be provided herein.

Figure 2:
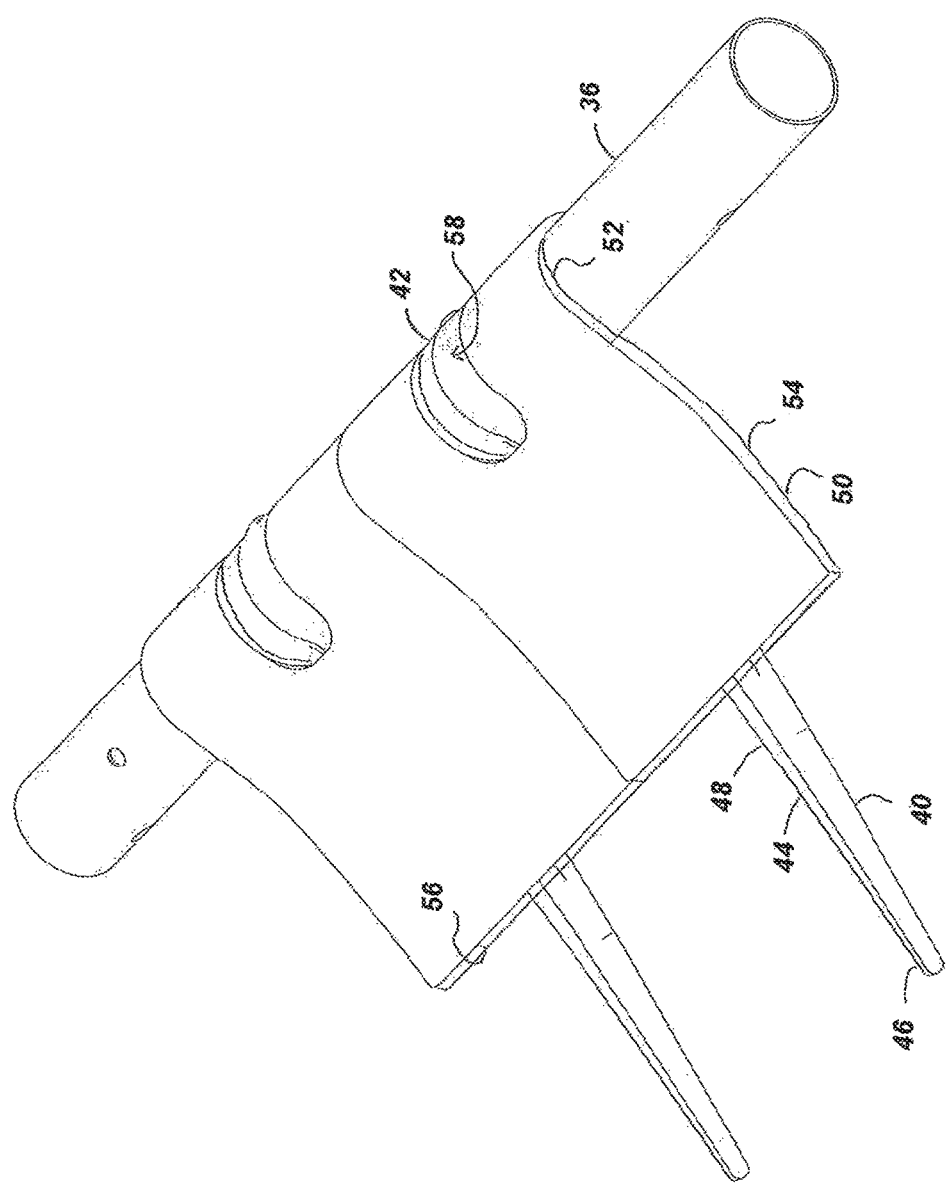
FIG. 2 is an perspective view of a part of the tine tube and two fingers of the reel of FIG. 1 showing an embodiment of tine paddles of the present invention.
Figure 3:
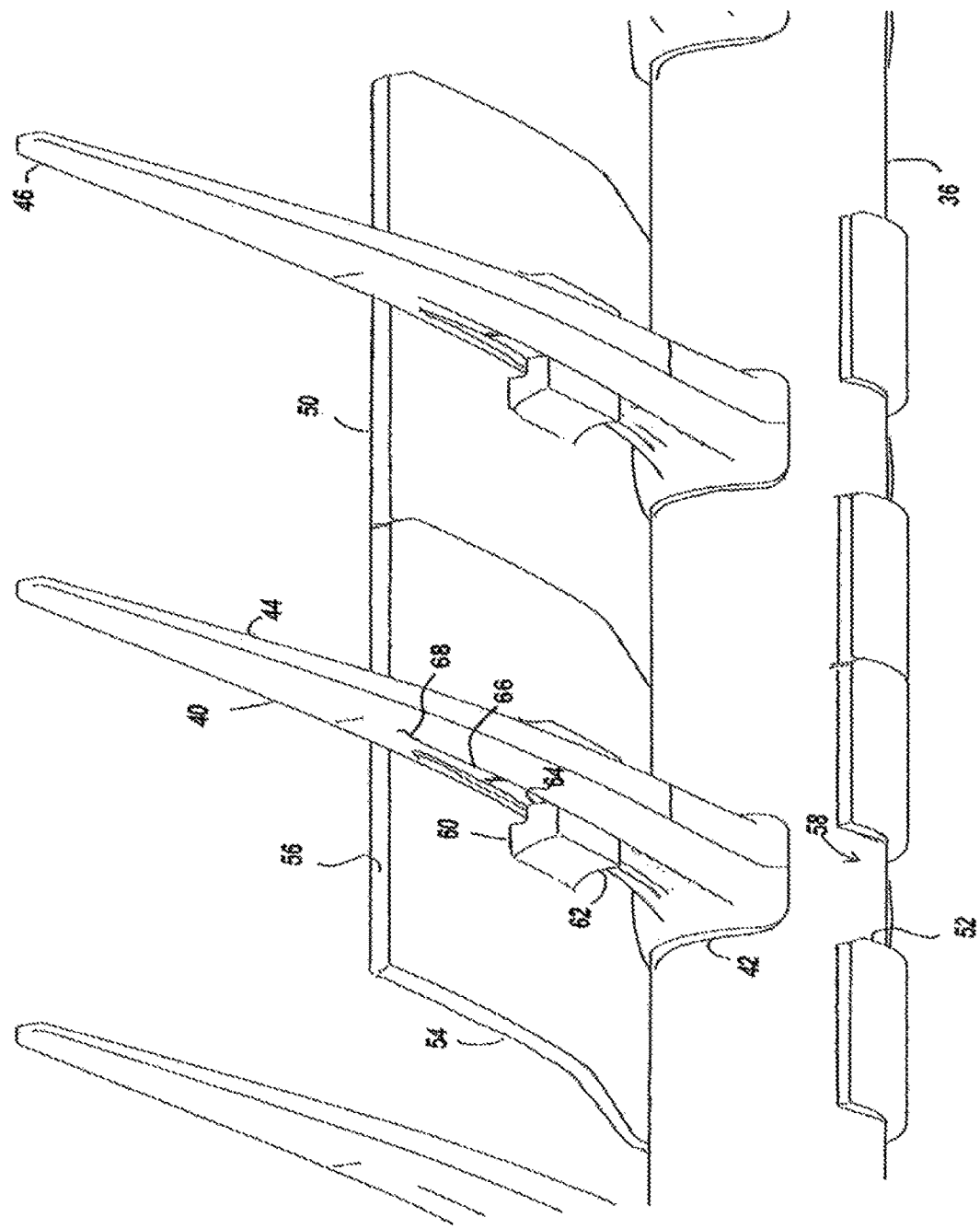
FIG. 3 is an underside perspective view of part of the tine tube showing the tine paddles attached to tines.

Turning now to FIGS. 2 and 3, each tine 40 includes a generally C-shaped mounting base 42 that is adapted to receive and embrace the tine tube 36 on which the tine 40 is mounted. An elongated, slightly curved and pointed finger 44 is integrally secured to base 42 and projects outwardly therefrom to an outer end or tip 46 of the finger 44. When tine 40 is attached to its tine tube 36, the slightly concave, curved face 48 of the finger 44 faces rearwardly generally in the direction of crop flow so that finger 44 has an aggressive action as it engages and rakes through the crop materials. The finger 44 is laterally centered with respect to the mounting base 42, although it is disposed generally adjacent one end of the C-shaped mounting base 42. Preferably, the mounting base 42 and finger 44 are both constructed from a suitable synthetic resinous material such as polyurethane and are molded as one piece. One exemplary tine 40 is shown in commonly assigned U.S. Pat. No. 9,095,095 to Mcgehee et al.

According to the present invention, at least one of the plurality of tines 40 has a tine paddle 50 mounted on its finger 44 and to the tine tube 36 so as to engage the crop materials as the tine 40 rakes through the crop materials. In one embodiment, further tine paddles 50 are installed so that all of the tines 40 mounted on the tine tubes 36 of the entire reel 20 are covered by tine paddles 50. In another embodiment, tine paddles 50 are installed on some but not all of the tines 40 so that only portions of the tine tubes 36 of the reel 20 are covered by tine paddles 50.

Figure 4:
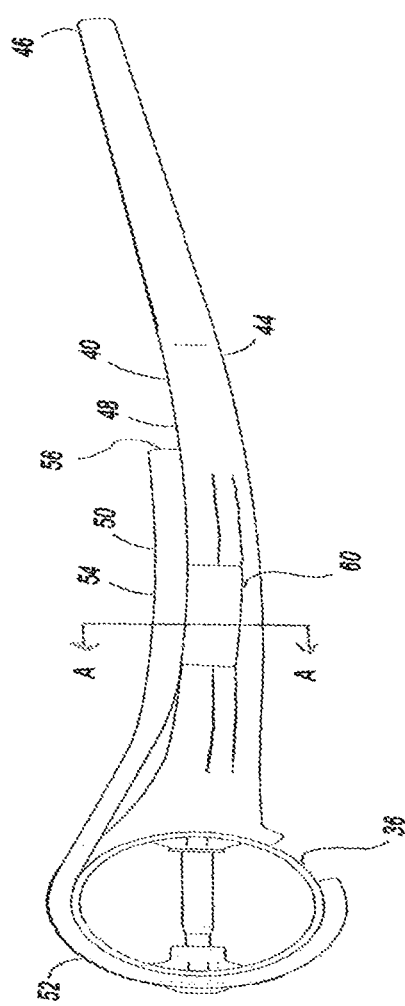
FIG. 4 is a side elevation view of the part of the tine tube and tine paddles of FIG. 2.

Turning also now to FIG. 4, each tine paddle 50 comprises a collar portion 52 for at least partially wrapping around the tine tube 36 and an elongate plate member 54 with a distal end 56 spaced inwardly from the outer tip 46 of the finger 40. As perhaps best seen in FIG. 5, in the illustrated embodiment the collar portion 52 has an aperture 58 that receives the mounting base 42 of the tine 40 so that the collar portion 52 engages flush against the tine tube 36. The plate member 54 has a common concave shape with the finger 44 and is arranged to lie against the face 48 of the finger 44 as best seen in FIG. 4. In the illustrated embodiment, the tine paddle 50 has a width such that each paddle connects to a single finger 44, and together with adjacent tine paddles 50 on adjacent tines 40, bridges the space between the fingers 40 such that the plate members 54 jointly form a substantially continuous member along a length of the tine tube 36. However, one skilled in the art will understand that a single tine paddle 50 may have a width sufficient to connect to two, three, or even more tines 40 without departing from the scope of the invention. Desirably the tine paddle 50 is formed of a suitable synthetic resinous material such as polyurethane such as by extrusion.

Figure 5:
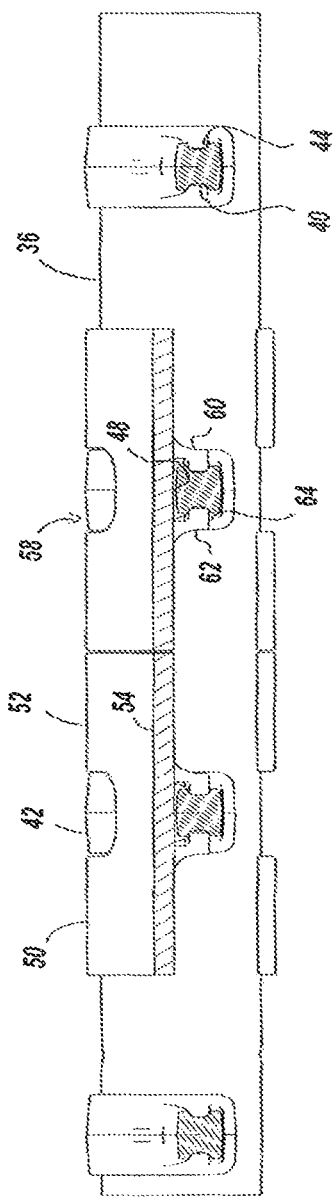
FIG. 5 is a cross-sectional view along the lines A-A of FIG. 4.

As best seen in FIGS. 3 and 5, one side of the plate member 54 has first and second detents 60 arranged to partially wrap around and engage the finger 44 to hold the paddle 50 on the tine 40. Desirably, each detent 60 is formed of a downwardly extending wall 62 and an inwardly extending catch 64 that is received in a notch 66 in a side portion 68 of the finger 44. As best seen in FIG. 4, the detents desirably extend only a portion of the length of the plate member 54 and are arranged between the collar portion 52 and the distal end 56 of the plate member 54. Additionally, the tine paddle 50 may also be fastened to the tine 40 by at least one of screw fastener which passes through the plate member 54 and engages into the finger 44. These fasteners co-operate with the engagement of the detents 60 with the fingers 44 and the collar portion 52 wrapping around a portion of the tine tube 36 to hold the tine paddle 50 in place with minimal time required to complete the fastening.

The use of a tine paddle 50 with the projecting fingers 44 is found to provide enhanced sweeping action of the crop over the cutter bar while the extended finger tips 46 can still engage lying crop in a manner which is beneficial in short or light crop.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A reel of a harvesting header for harvesting crop materials having a plurality of tine tubes at spaced positions around a rotational axis of the reel and a plurality of longitudinally-spaced tines mounted on each of the plurality of tine tubes configured to project outwardly from the tine tubes for engaging the crop materials, wherein each tine tube pivots about its own individual axis so as to change the angular orientation of the tines mounted thereon as the tine tubes rotate through different zones around the reel as the reel rotates about the rotational axis of the reel, each tine having a mounting base configured to receive the tine tube on which the tine is mounted and an elongated finger projecting outwardly from the mounting base to an outer elongated finger tip, the reel comprising:

a tine paddle mounted to one of the plurality of tines so as to engage the crop materials as the tine rakes through the crop materials, the tine paddle comprising a collar portion for at least partially wrapping around the tine tube to which the tine is mounted and an elongate plate member with a distal end spaced inwardly from the outer elongated finger tip of the tine to which the tine paddle is mounted, wherein one side of the elongate plate member has first and second detents arranged to partially wrap around and engage the elongated finger to hold the tine paddle on the tine, wherein each of the first and second detents has an inwardly extending catch that is received in a notch in first and second side portions of the elongated finger.

2. The reel of claim 1 wherein the reel comprises one tine paddle mounted to each of the plurality of tines on each of the plurality of tine tubes.

3. The reel of claim 1 wherein the reel comprises a plurality of tine paddles mounted to more than one of the plurality of tines on each of the plurality of tine tubes but not all of the tines on each of the tine tubes.

4. The reel of claim 1 wherein the collar portion has an aperture that receives the mounting base of the tine to which the at tine paddle is mounted so that the collar portion engages flush against the tine tube to which the tine is mounted.

5. The reel of claim 1 wherein the tine paddle has a width such that tine paddle connects to a single elongated finger.

\* \* \* \* \*